(12) United States Patent
Ramanathan et al.

(10) Patent No.: US 11,979,848 B2
(45) Date of Patent: *May 7, 2024

(54) ACCESS POINT BASED LOCATION SYSTEM FOR HIGH DENSITY WIFI DEPLOYMENTS

(71) Applicant: Cisco Technology, Inc., San Jose, CA (US)

(72) Inventors: Shankar Ramanathan, Richardson, UT (US); Akram I. Sheriff, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,587

(22) Filed: May 16, 2022

(65) Prior Publication Data
US 2022/0272657 A1    Aug. 25, 2022

Related U.S. Application Data

(63) Continuation of application No. 16/900,740, filed on Jun. 12, 2020, now Pat. No. 11,337,176.

(51) Int. Cl.
*H04W 64/00* (2009.01)
*H04B 17/318* (2015.01)
*H04W 4/029* (2018.01)
*H04W 24/10* (2009.01)

(52) U.S. Cl.
CPC ........ *H04W 64/003* (2013.01); *H04B 17/318* (2015.01); *H04W 4/029* (2018.02); *H04W 24/10* (2013.01); *H04W 64/006* (2013.01)

(58) Field of Classification Search
CPC ... H04W 64/003; H04W 4/029; H04W 24/10; H04W 64/006; H04B 17/318
See application file for complete search history.

(56) References Cited

U.S. PATENT DOCUMENTS

2011/0086636 A1* 4/2011 Lin ................ H04W 24/02
455/434

* cited by examiner

*Primary Examiner* — Kabir A Timory
(74) *Attorney, Agent, or Firm* — Patterson + Sheridan, LLP (57) ABSTRACT

Techniques for access point (AP) based location computation are disclosed. A target wireless AP, communicatively coupled to a wireless station (STA), is identified. One or more location buddy APs, relating to the target AP, are identified based on the physical locations of the location buddy APs and the target AP. It is determined that a first location buddy AP, of the one or more location buddy APs, is communicatively coupled to the STA, and in response a location of the STA is determined using the target AP.

20 Claims, 10 Drawing Sheets

ACCESS POINT BASED LOCATION SYSTEM FOR HIGH DENSITY WIFI DEPLOYMENTS

CROSS-REFERENCE TO RELATED APPLICATIONS

This application is a continuation of co-pending U.S. patent application Ser. No. 16/900,740 filed Jun. 12, 2020. The aforementioned related patent application is herein incorporated by reference in its entirety.

TECHNICAL FIELD

Embodiments presented in this disclosure generally relate to wireless networking. More specifically, embodiments disclosed herein relate to location computation using location buddy access points.

BACKGROUND

Access points (APs) in a wireless networking environment can be used to compute the location of wireless stations (STAs) connected to the wireless network. For example, received signal strength indication (RSSI) for an STA and AP can be used to estimate how distant, or close, the STA is to the AP. But current location tracking mechanisms can suffer from large inaccuracies. For example, STAs may be computed as located on the wrong floor in a multi-story environment (e.g., an office building) or may be incorrectly computed as located outside the boundaries of a building.

This can be particularly problematic in high density deployments. For example, an STA may be computed as located on a different floor from its actual location based on the STA's proximity to APs on floors above or below the STA's actual location. As another example, deployments where higher antenna gain outdoor APs are located near the floors where indoor grade APs are also present can also be problematic. In that circumstance, the STA may be pulled toward the high gain AP location and the location of the STA may be incorrectly computed as located outside a building, near the higher gain outdoor AP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes identifying a first target wireless access point (AP) radio communicatively coupled to a wireless station (STA). The method further includes identifying a first one or more location buddy AP radios, relating to the first target AP radio, based on physical location of the first one or more location buddy AP radios and the first target AP radio. The method further includes determining that a first location buddy AP radio of the first one or more location buddy AP radios is communicatively coupled to the STA, and in response determining a location of the STA using the first target AP radio. The method further includes identifying a second target AP radio communicatively coupled to the STA. The method further includes identifying a second one or more location buddy AP radios relating to the second target AP radio. The method further includes determining that none of the second one or more location buddy AP radios is communicatively coupled to the STA, and in response declining to use the second target AP radio for determining the location of the STA.

Embodiments further include a computer program product, including a non-transitory computer-readable storage medium having computer-readable program code embodied therewith, the computer-readable program code executable by one or more computer processors to perform an operation. The operation includes identifying a target wireless access point (AP) radio communicatively coupled to a wireless station (STA). The operation further includes identifying one or more location buddy AP radios, relating to the target AP radio, based on physical location of the one or more location buddy AP radios and the target AP radio. The target AP radio and the one or more location buddy AP radios are grouped, prior to identifying the target wireless AP radio, based on a map including a digital image and depicting the physical location of the one or more location buddy AP radios and the target AP radio. The grouping the target AP radio and the one or more location buddy AP radios includes using image recognition to identify the physical location of the one or more location buddy AP radios and target AP radio in the digital image. The operation further includes determining that a first location buddy AP radio of the one or more location buddy AP radios is communicatively coupled to the STA, and in response determining a location of the STA using the target AP radio.

Embodiments further include a system, including a processor and a memory storing a program, which, when executed on the processor, performs an operation. The operation includes identifying a first target wireless access point (AP) radio communicatively coupled to a wireless station (STA). The operation further includes identifying a first one or more location buddy AP radios, relating to the first target AP radio, based on physical location of the first one or more location buddy AP radios and the first target AP radio. The operation further includes determining that a first location buddy AP radio of the first one or more location buddy AP radios is communicatively coupled to the STA, and in response determining a location of the STA using the first target AP radio. The operation further includes identifying a second target AP radio communicatively coupled to the STA. The operation further includes identifying a second one or more location buddy AP radios relating to the second target AP radio. The operation further includes determining that none of the second one or more location buddy AP radios is communicatively coupled to the STA, and in response declining to use the second target AP radio for determining the location of the STA.

Example Embodiments

In an embodiment, strict RSSI logic can be used to estimate the location of an STA. For example, an STA with a strong RSSI to a given AP, can be assumed to be located near the AP, with the distance from the AP to the STA computed based on the RSSI. But this can be misleading, particularly in high density deployments (e.g., as discussed above). In these deployments a given STA can be computed as located on the incorrect floor, based on its proximity to APs located a floor above or below the STA. In one embodiment, de-duplication techniques can be used to avoid cross-floor location errors. But these techniques are typically not effective in true high density scenarios. High density scenarios can include a wide variety of deployments, including office buildings, stadiums, hotels, shopping malls, hospitals, etc.

One or more embodiments disclosed herein relate to using location buddies (e.g., a grouping of physically proximate APs) to accurately compute the location of an STA. In an embodiment, multiple APs can be grouped together as location buddies (e.g., manually by an administrator, or automatically using an image map of a deployment). These location buddies can then be used to improve location estimation for an STA, for example by identifying likely outlier APs and excluding the outlier APs from a location calculation. This can increase the accuracy of location estimation, especially in high density deployments.

Figure 1A:
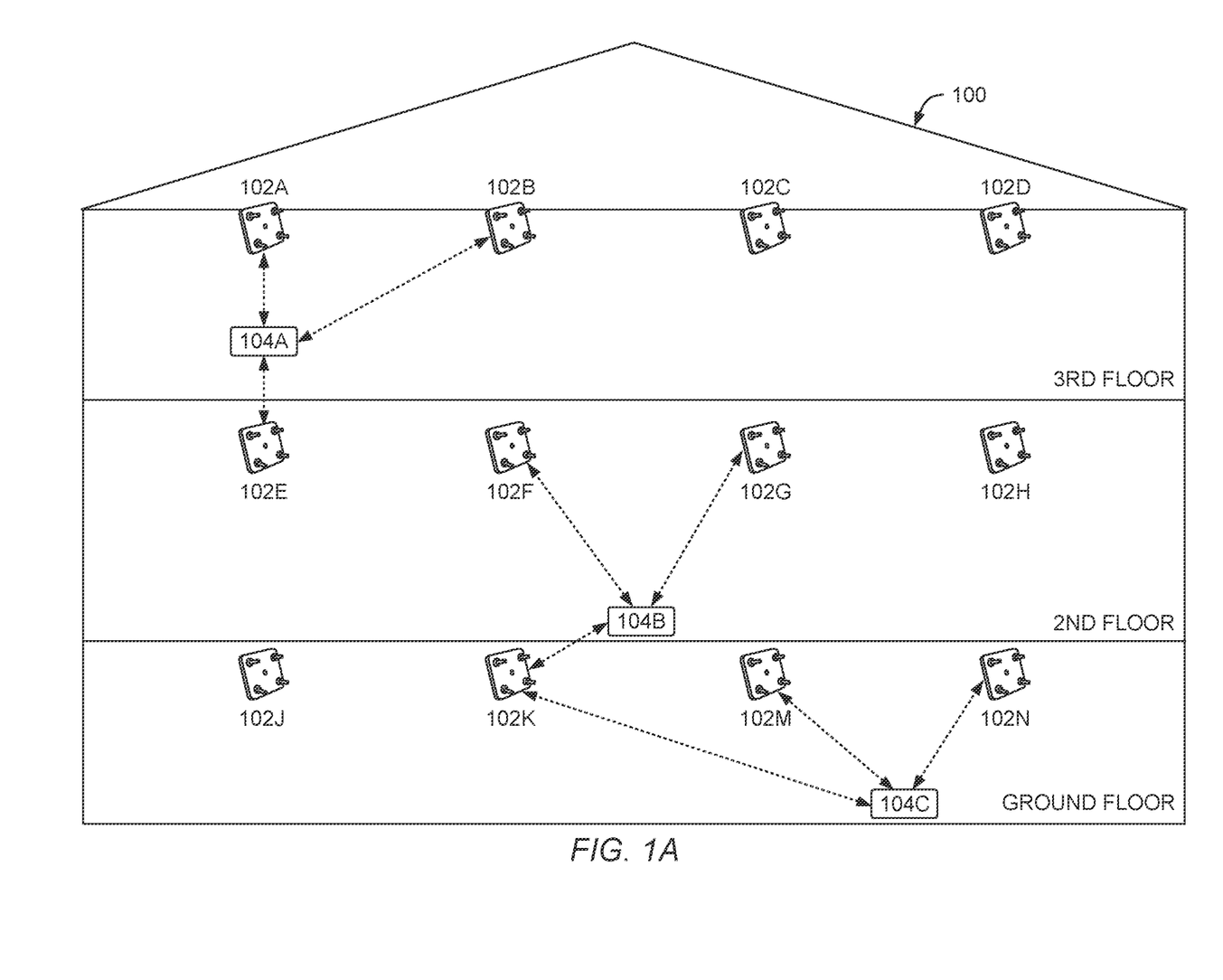
FIGS. 1A-1B illustrate deployment of STAs and APs in a high-density wireless deployment, according to according to at least one embodiment.
Figure 1B:
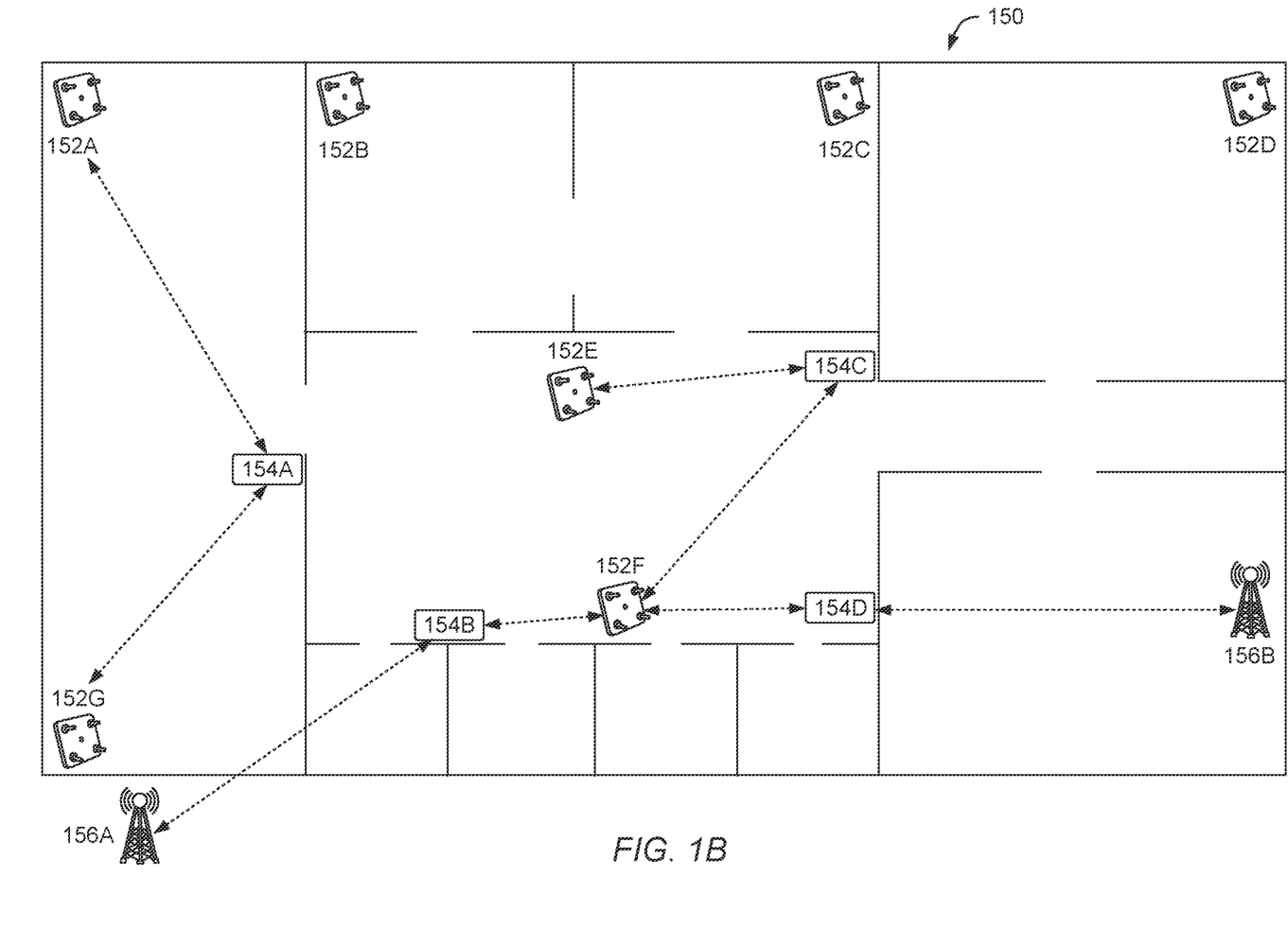

FIGS. 1A-1B illustrate deployment of STAs and APs in a high-density wireless deployment, according to according to at least one embodiment. FIG. 1A illustrates a building 100 that includes a number of APs 102A-N, and a number of STAs 104A-C. The STAs 104A-C can include any suitable wireless device, including a smartphone, laptop, tablet, wireless infrastructure device, or any other suitable wireless device. The building 100 can, for example, have three floors: a ground floor, a second floor, and a third floor. The ground floor can include the APs 102J-N (e.g., mounted in the ceiling). The second floor can include the APs 102E-H. The third floor can include the APs 102A-D.

An STA 104C is located on the ground floor. In an embodiment, the location of the STA 104C can be estimated based on triangulating its communication with the three APs with the highest RSSI: in the illustrated embodiment, this means the location of the STA 104C can be estimated using communication between the STA 104C and the APs 102M, 102N, and 102K. In this circumstance, relying on the three APs with the highest RSSI to the STA 104C is likely to be accurate. Using three APs is merely an example, and any suitable number of APs can be used (e.g., four APs could be used).

Using this same technique for the STA 104B, however, is likely to be inaccurate. In an embodiment, the location of the STA 104B can also be estimated based on communication with APs with the highest RSSI. Assuming the STA 104B is located near the ground on the second floor, and the AP 102K is mounted in the ceiling of the ground floor, the AP 102K may have the highest RSSI to the STA 104B (e.g., because signals can pass through the ceiling of the ground floor), and may be used to estimate the location of the STA 104B. This is very likely to give an inaccurate result, because the STA 104B is located on the second floor while the AP 102K is located on the ground floor. In particular, estimating that the STA 104B is located near the AP 102K is likely to be unhelpful, because the STA 104B is located on a different floor from the AP 102K.

Similarly, the location of the STA 104A can be estimated based on communication with APs with the highest RSS. This is also potentially inaccurate, because the AP 102E (e.g., located on the ceiling in the second floor) is located on a different floor from the STA 104A (e.g., located on the third floor). If the AP 102E is used to estimate the location of the STA 104A (e.g., in combination with the APs 102A and 102B), the location estimate may be inaccurate.

FIG. 1B illustrates a building 150 that includes a number of APs 152A-F, and a number of STAs 154A-D. Further, the building 150 is near two APs 156A-B with stronger radio antennas. In an embodiment, using APs with the highest RSSI to estimate the location of the STA 154C is likely to be accurate. The STA 154C is likely to have the highest RSSI from the APs 152E and 152F, and is also in close physical proximity to the APs 152E and 152F, and so using the APs 152E and 152F to estimate the location of the STA 154C is likely to be accurate.

Using APs with the highest RSSI is likely to be inaccurate, however, for the STA 154B. In an embodiment, the STA 154B may have a strong RSSI to the AP 156A, because the AP 156A has a higher gain radio antenna (e.g., because the AP 156A is intended to operate outdoors). But the AP 156A is located outdoors, and estimating the location of the STA 154B using the AP 156A (e.g., in combination with the AP 152F) is likely to be inaccurate: the STA 154B may be estimated as located outdoors (e.g., like the AP 156A), when it is actually located indoors. This is similarly true of the STA 154D. The AP 156B (e.g., located in a courtyard outside the building 150) may have a strong signal to the STA 154D because of a stronger radio antenna. Using the AP 156B to estimate the location of the STA 154D could result in an inaccurate estimate (e.g., that the STA 154D is located outside the building in a courtyard).

As discussed above, a high-density wireless deployment can include a wide variety of scenarios, including office buildings, stadiums, hotels, shopping malls, hospitals, etc. These are merely examples. Further, the illustrated techniques are not limited to high density deployments. These techniques could be used in any suitable deployment.

Figure 2:
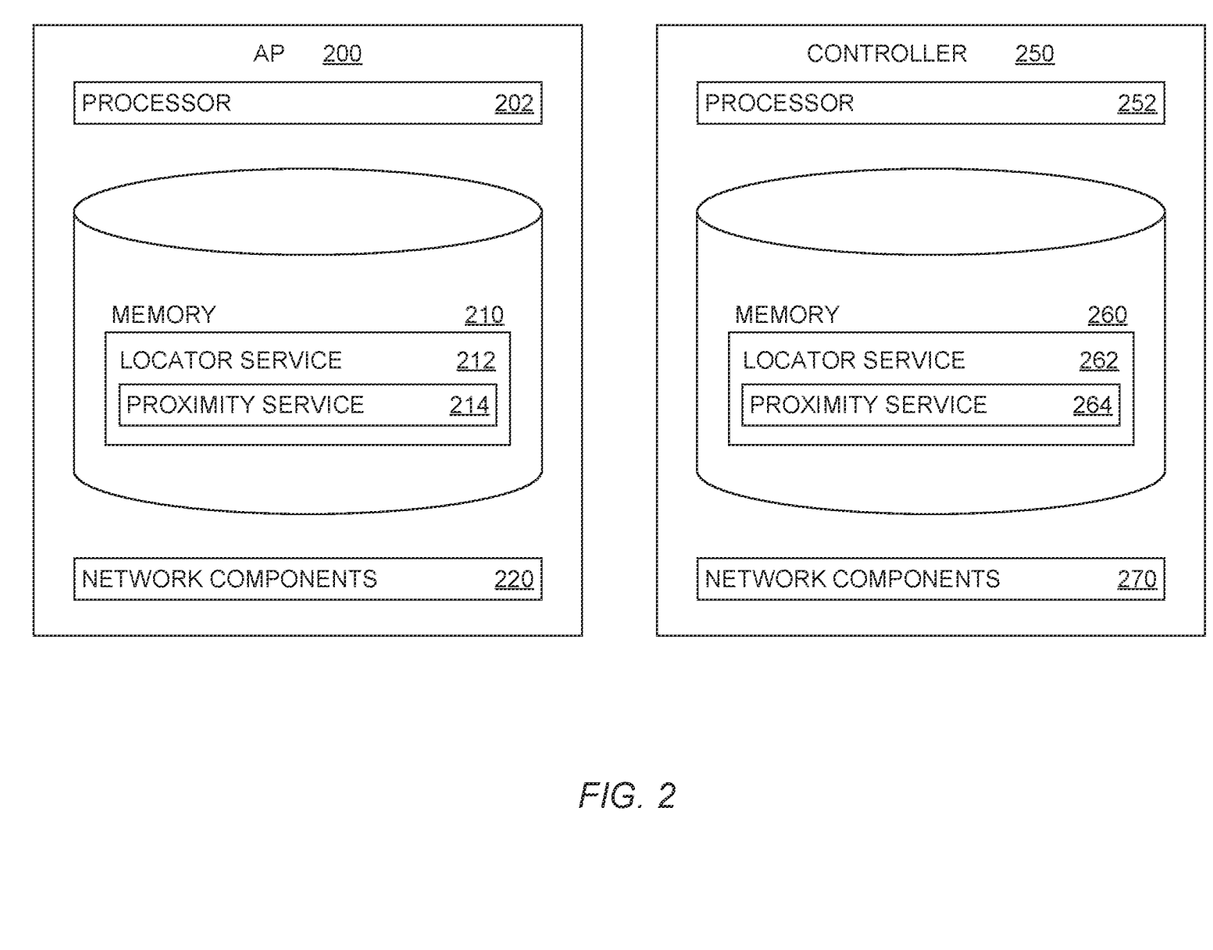
FIG. 2 illustrates an AP and a controller configured to use location buddies to compute the location of an STA, according to according to at least one embodiment.

FIG. 2 illustrates an AP 200 and a controller 250 configured to use location buddies to compute the location of an STA, according to according to at least one embodiment. The AP 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the AP 200 to interface with a communication network, as discussed above in relation to FIGS. 1A-B. For example, the network components 220 can include wired, WiFi or cellular network interface components and associated software to facilitate communication between the AP 200, one or more STAs, and a controller 250.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the AP 200. The program code is generally described as various functional "applications" or "modules" within the memory 210, although alternate implementations may have different functions and/or combinations of functions.

Within the memory 210, a locator service 212 facilitates estimating the location of an STA (e.g., as discussed above in relation to FIGS. 1A-B). This is discussed in further detail in subsequent figures. The locator service 212 includes a proximity service 214. In an embodiment, the proximity service 214 uses location buddies to determine proximity between AP for estimating the location of the STA.

FIG. 2 further includes a block diagram illustrating controller 250. In an embodiment, an AP (e.g., the AP 200) can be used to estimate the location of an STA. Alternatively, or in addition, a controller can be used. For example, the controller 250 can be a central controller in communication with one or more APs 200. The APs 200 can use the locator service 262, discussed further below, to estimate the location of an STA. For example, the APs 200 can provide RSSI for an STA, and other parameters, to the controller 250 and the controller 250 can use this to estimate the location of the STA. Further, a combination of one or more controllers 250 and one or more APs 200 can be used.

The controller 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the controller 250 to interface with a wireless communication network, as discussed above in relation to FIG. 1-B. For example, the network components 270 can include wired, WiFi or cellular network interface components and associated software to facilitate communication between the AP 200 and the controller 250.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the controller 250. The program code is generally described as various functional "applications" or "modules" within the memory 260, although alternate implementations may have different functions and/or combinations of functions.

Within the memory 260, a locator service 262 facilitates estimating the location of an STA (e.g., as discussed above in relation to FIGS. 1A-B). This is discussed in further detail in subsequent figures. The locator service 262 includes a proximity service 264. In an embodiment, the proximity service 264 uses location buddies to determine proximity between AP for estimating the location of the STA. These are both discussed in more detail in subsequent figures.

Figure 3:
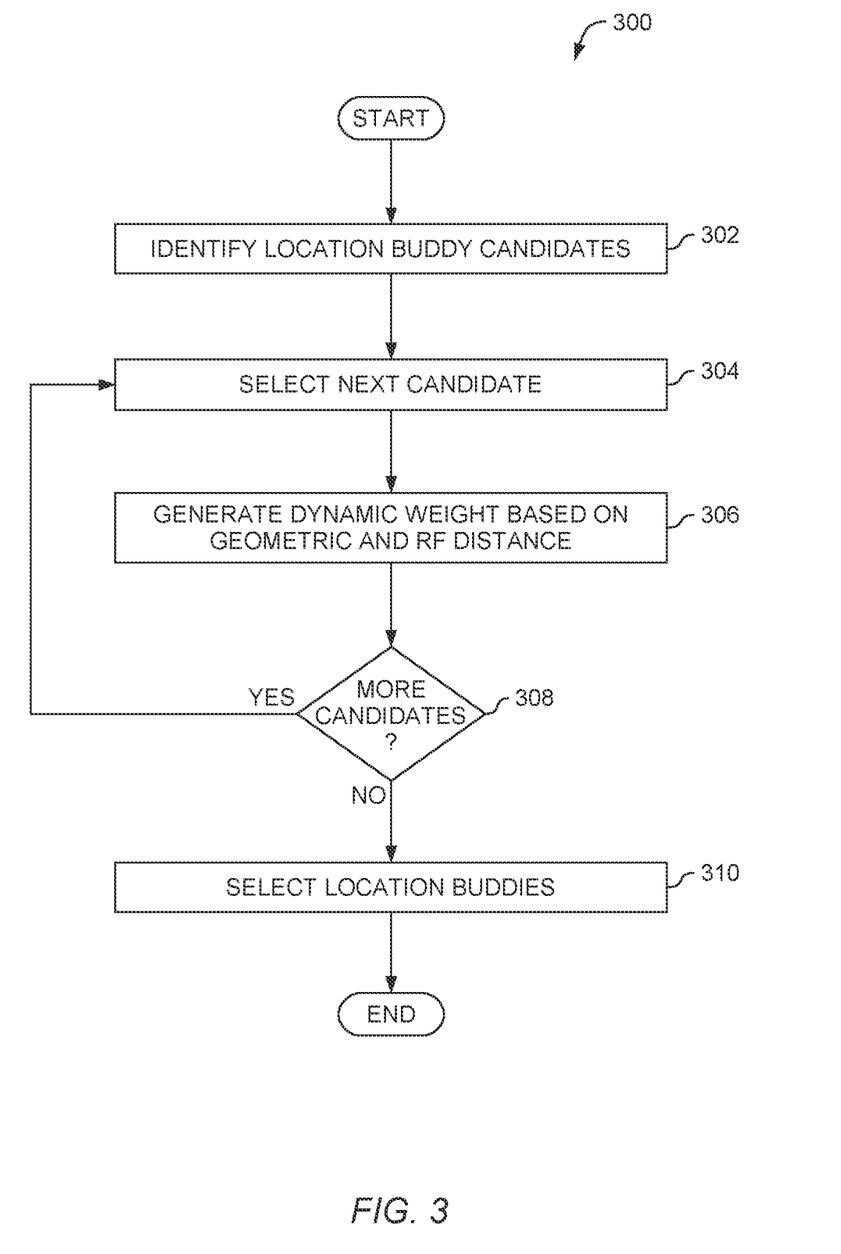
FIG. 3 is a flowchart for identifying location buddies to compute the location of an STA, according to according to at least one embodiment.

FIG. 3 is a flowchart 300 for identifying location buddies to compute the location of an STA, according to according to at least one embodiment. At block 302 a proximity service (e.g., the proximity service 214 or the proximity service 264 illustrated in FIG. 2) identifies location buddy candidates for a target AP. In an embodiment, a user (e.g., a system administrator) can manually select location buddies (e.g., using a suitable user interface). In this embodiment, the flow ends after block 302 as the user manually selects the location buddies. Alternatively, or in addition, the location buddy candidates can be identified based on a map of APs in a deployment (e.g., using image recognition techniques). These are discussed further with regard to FIG. 4, below.

At block 304, the proximity service selects the next location buddy candidate. At block 306, the proximity service generates a dynamic weight for the candidate to the target AP. In an embodiment, this dynamic weight is based on both radio frequency (RF) distance from the candidate to the target AP and geometric distance.

For example, the proximity service can apply an inverse distance weighting algorithm from each candidate AP to the target AP. This can be based, in an embodiment, on image recognition techniques. In an embodiment, as discussed further below with regard to FIG. 4, image recognition techniques can be used to identify geometric distance between APs using an image map of the physical locations of the APs.

Any suitable inverse distance weighting algorithm can be used. For example Shepard's method can be used to define increasing radius values for candidate APs to the target AP. Alternatively, or in addition, the Łukaszyk-Karmowski metric (or another modification of Shepard's method) can be used. In an embodiment, the algorithm used can be implementation dependent. The distance between the candidate AP and the target AP can be represented as a weight (e.g., a measure of the distance). In an embodiment, this weight can be stored and re-used when using location buddies to estimate a location of an STA, as discussed below with regard to FIGS. 5-6. In an embodiment, the weight can be positive or negative. For example, an obstruction factor could be used to determine whether a weight should be positive or negative.

As discussed above, in an embodiment both physical distance and RF distance between a candidate AP and the target AP can contribute to the creation of the weight, but the physical distance and the RF distance act as negative gates to each other. This is because nearby APs may not hear each other, for example because of obstacles. Therefore, it may be common for a given STA that is hear on one AP to not be heard on a physically nearby AP. Similarly, multiple APs that are close RF neighbors, may not be physical neighbors. For example, as illustrated above with regard to FIGS. 1A-B, APs may be located on different floors (e.g., one on the ceiling and another on the floor), or one of the APs may include a strong antenna but may be located outside of a building (e.g., in a courtyard).

As one example, assume a given STA has strong RSSI to three APs. Two of those APs, but not the third, are themselves determined to be in close proximity (e.g., using the techniques described above). The STA is more likely to be close to the two APs that are themselves physical proximate, because an STA that were physical close to the other AP would likely not be heard by the other two physically proximate APs.

At block 308, the proximity service determines whether there are more candidate APs for the target AP (e.g., identified at block 302). If yes, the flow proceeds back to block 304. If no, the flow proceeds to block 310. At block 310, the proximity service selects location buddies for the target AP. In an embodiment, this is based on the weight generated at block 306. For example, the proximity service can identify a set number of the candidate APs with the highest weight (e.g., the top 3). Alternatively, or in addition, the proximity service can use a threshold (e.g., preconfigured or input by a user through a user interface) and identify all candidate APs that satisfy the threshold.

Figure 4:
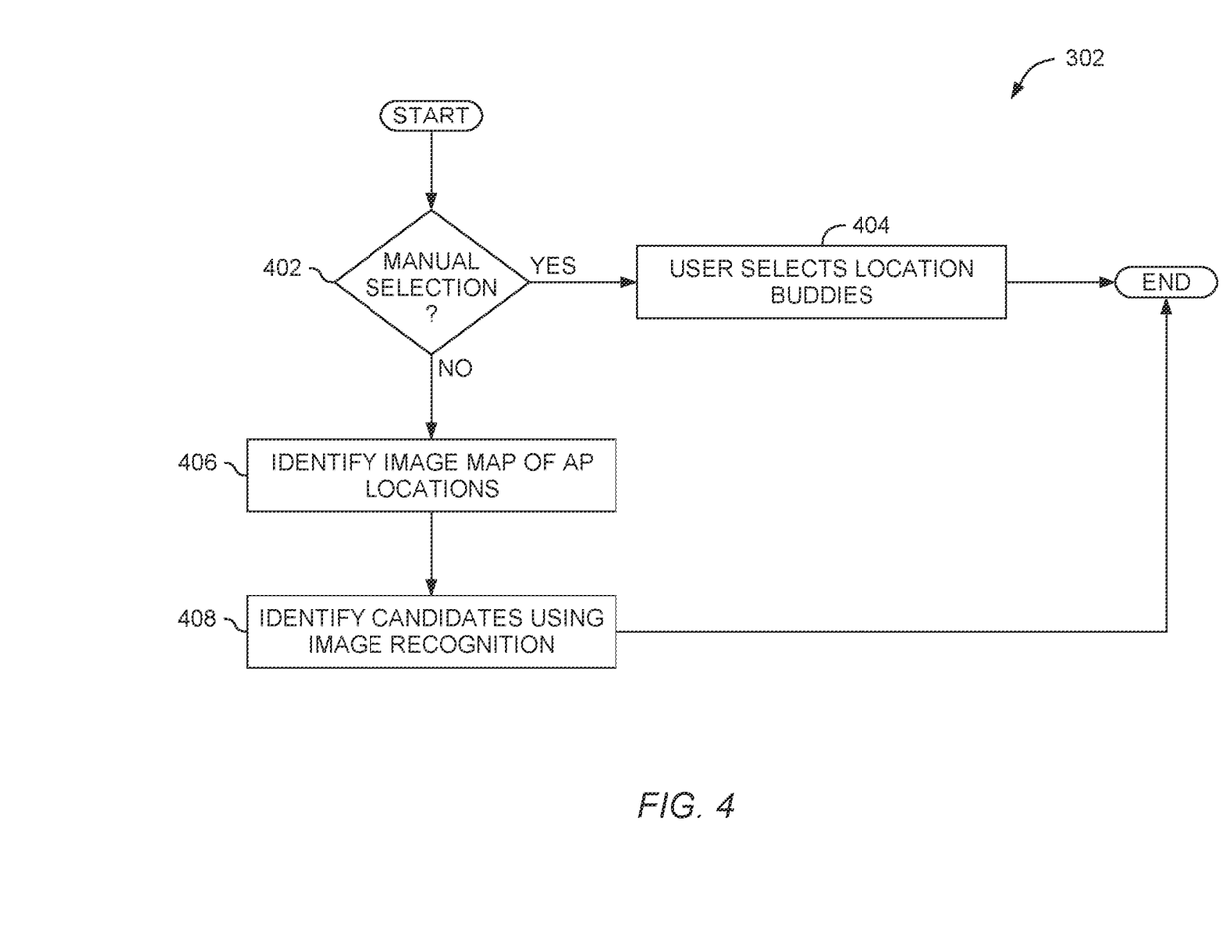
FIG. 4 is a flowchart for identifying location buddy candidates to compute the location of an STA, according to according to at least one embodiment.

FIG. 4 is a flowchart for identifying location buddy candidates to compute the location of an STA, according to according to at least one embodiment. In an embodiment, FIG. 4 corresponds with block 302 illustrated in FIG. 3. At block 402 a proximity service (e.g., the proximity service 214 or the proximity service 264 illustrated in FIG. 2) determines whether to use manual selection for location buddies. As discussed above, in one embodiment a user (e.g., a system administrator) can identify location buddies manually.

If yes, the flow proceeds to block 404. At block 404, the user manually selects the location buddies. For example, the user can use a suitable user interface. Alternatively, or in addition, the selected location buddies can be provided directly to the proximity service (e.g., using a configuration file, a network service, a network storage location, etc.).

If manual selection is not enabled, the flow proceeds to block 406. At block 406, the proximity service identifies an image map of the physical locations of APs in the deployment (e.g., a digital image). In an embodiment, this image map is maintained as part of a network management tool (e.g., a Cisco DNA™ product). For example, the network management tool can maintain site, and building, maps and corresponding AP location placements as image files. Alternatively, the image map can be provided to the proximity service (e.g., using a remote network service or storage location) or generated by a user (e.g., using a suitable user interface).

At block 408, the proximity service identifies location buddy candidates using image recognition. For example, the proximity service can identify all APs located on a given floor of a building as location buddy candidates. As another example, the proximity service can identify a subset of APs located in a particular area of a deployment as location buddy candidates (e.g., within an exhibition hall or a single story building). These are merely examples, and any suitable technique can be used. Further, standard image recognition techniques can be used to analyze the image map and identify location buddy candidates.

Figure 5:
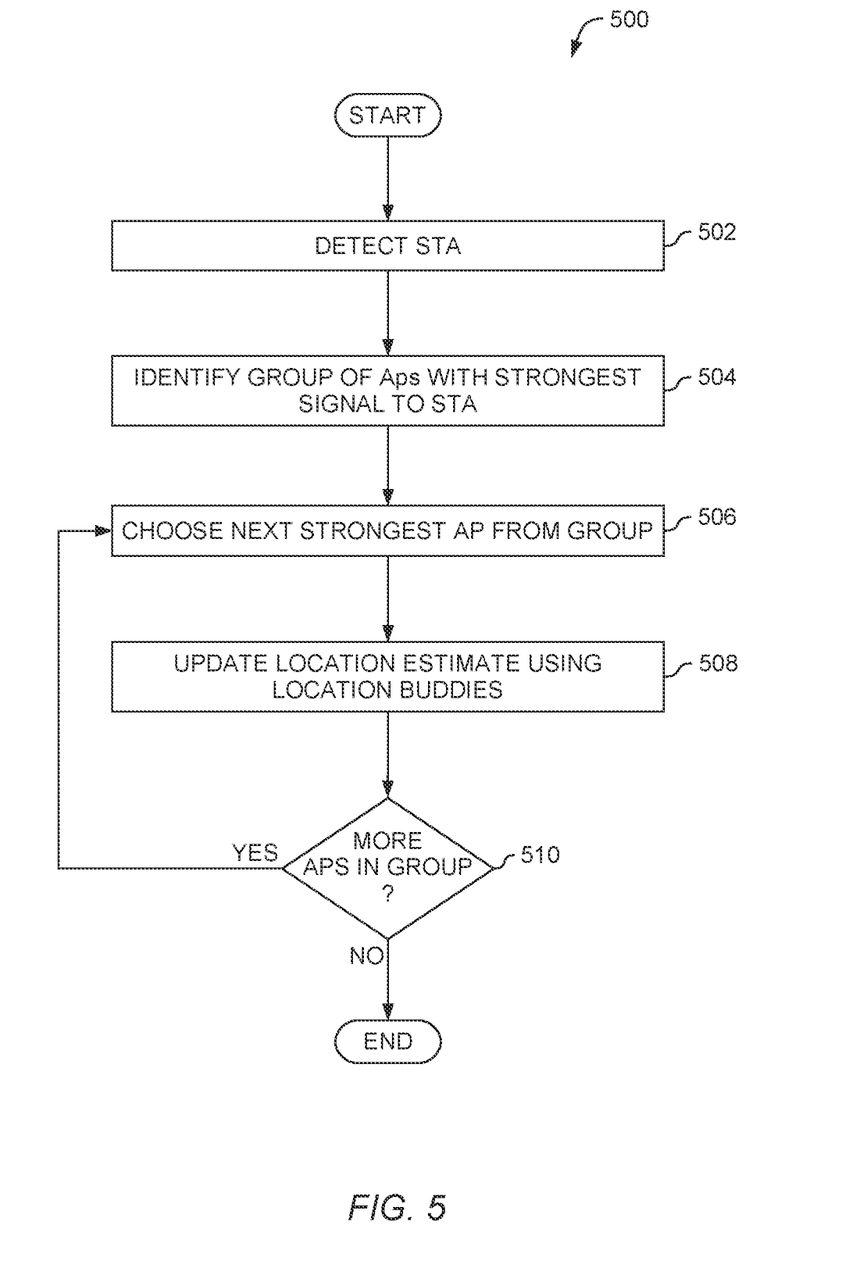
FIG. 5 is a flowchart for using location buddies to compute the location of an STA, according to according to at least one embodiment.

FIG. 5 is a flowchart 500 for using location buddies to compute the location of an STA, according to according to at least one embodiment. At block 502 a proximity service (e.g., the proximity service 214 or the proximity service 264 illustrated in FIG. 2) detects the STA for which a location is to be estimated. For example, the STA may have been recently added to the network, a user may have selected the STA for location estimation, the STA may have been selected as part of a periodic location estimation process, etc.

At block 504, the proximity service identifies a group of APs with the strongest signal strength (e.g., RSSI) to the STA. In an embodiment, selecting a group of APs is likely to be more effective than selecting a single AP with the strongest signal strength to the AP. In an alternative embodiment, however, a single AP could be selected.

At block 506, the proximity service selects the next strongest AP from the group (e.g., the AP with the next strongest RSSI to the STA). At block 508, the proximity service updates the location estimation for the STA using the selected AP and its location buddies. This is discussed further with regard to FIG. 6, below.

At block 510, the proximity service determines whether more APs remain in the group. If yes, the flow returns to block 506. If no, the flow ends.

Figure 6:
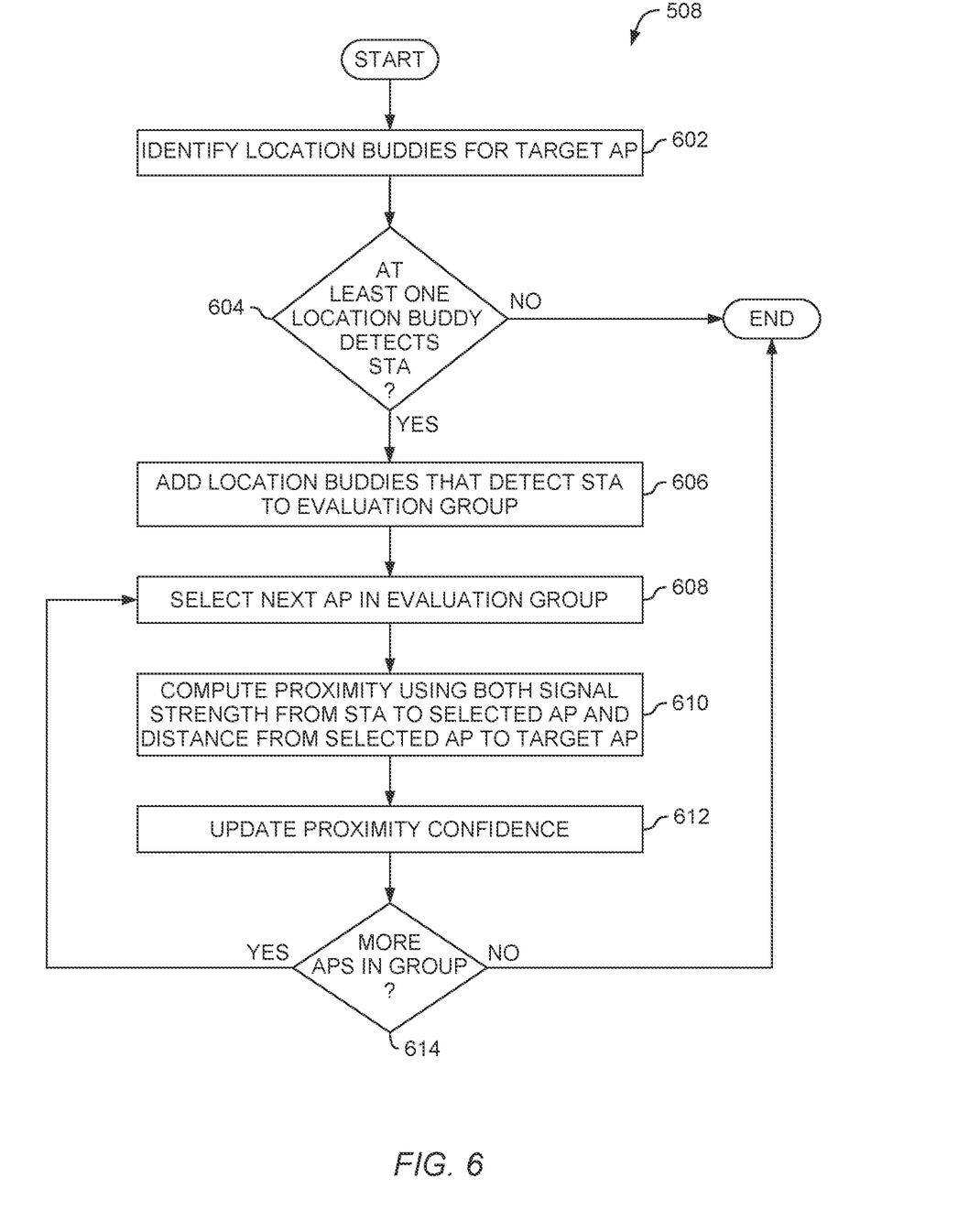
FIG. 6 is a flowchart for updating a location estimate using location buddies, according to according to at least one embodiment.

FIG. 6 is a flowchart for updating a location estimate using location buddies, according to according to at least one embodiment. In an embodiment, FIG. 6 corresponds with block 508 illustrated in FIG. 5, above. At block 602, a proximity service (e.g., the proximity service 214 or the proximity service 264 illustrated in FIG. 2) identifies the location buddies for the target AP. For example, as discussed above with regard to FIGS. 3-4, the proximity service can select one or more location buddy candidates for each AP in the network.

At block 604, the proximity service determines whether at least one of the identified location buddies detects the STA (e.g., using radio transmissions from the AP to the STA). If no, the flow ends. For example, if none of the location buddies for a target AP detect the STA, it is likely that the target AP is an outlier (e.g., located on a different floor from the STA or at a large physical distance from the STA) and the target AP should not be used in the location estimation.

Returning to block 604, if yes the flow proceeds to block 606. At block 606, the proximity service adds the location buddies that detect the STA to an evaluation group. In an embodiment, the evaluation group includes the target AP and these additional location buddies that detect the STA.

At block 608, the proximity service selects the next AP in the evaluation group. At block 610, the proximity service computes the proximity of the selected AP to the STA using both signal strength between the selected AP and the STA (e.g., RSSI) and the distance between the selected AP and the target AP. In an embodiment, the proximity service combines the RSSI from the selected AP to the STA and the distance from the selected AP to the main AP (e.g., the dynamic weight generated at block 306 in FIG. 3, above). In an embodiment, the main AP has a distance of 1 to itself. This combination is logarithmic if the distance is Euclidian, and can therefore be linearized. As such, if the STA is near the target AP, the STA signal should be weaker at the neighboring APs (e.g., the location buddies), as the distance of the neighboring APs to the target AP becomes larger.

At block 612, the proximity service updates the proximity confidence for the proximity estimate between the target AP and the STA. For example, as described above with regard to FIGS. 1A-B, the location of the STA can be estimated based on the RSSI between the STA and a nearby AP. The proximity service updates a confidence value for the target AP to be used to estimate the location of the AP, based on the proximity of the selected AP to the STA computed at block 610. In an embodiment, this normalizes the location estimation across a group of APs (e.g., location buddies) to help decrease, or eliminate, the effects of APs on the wrong floor or at a large physical distance detecting an STA.

At block 614, the proximity service determines whether more APs remain in the evaluation group. If yes, the flow returns to block 608. If not, the flow ends.

Figure 7:
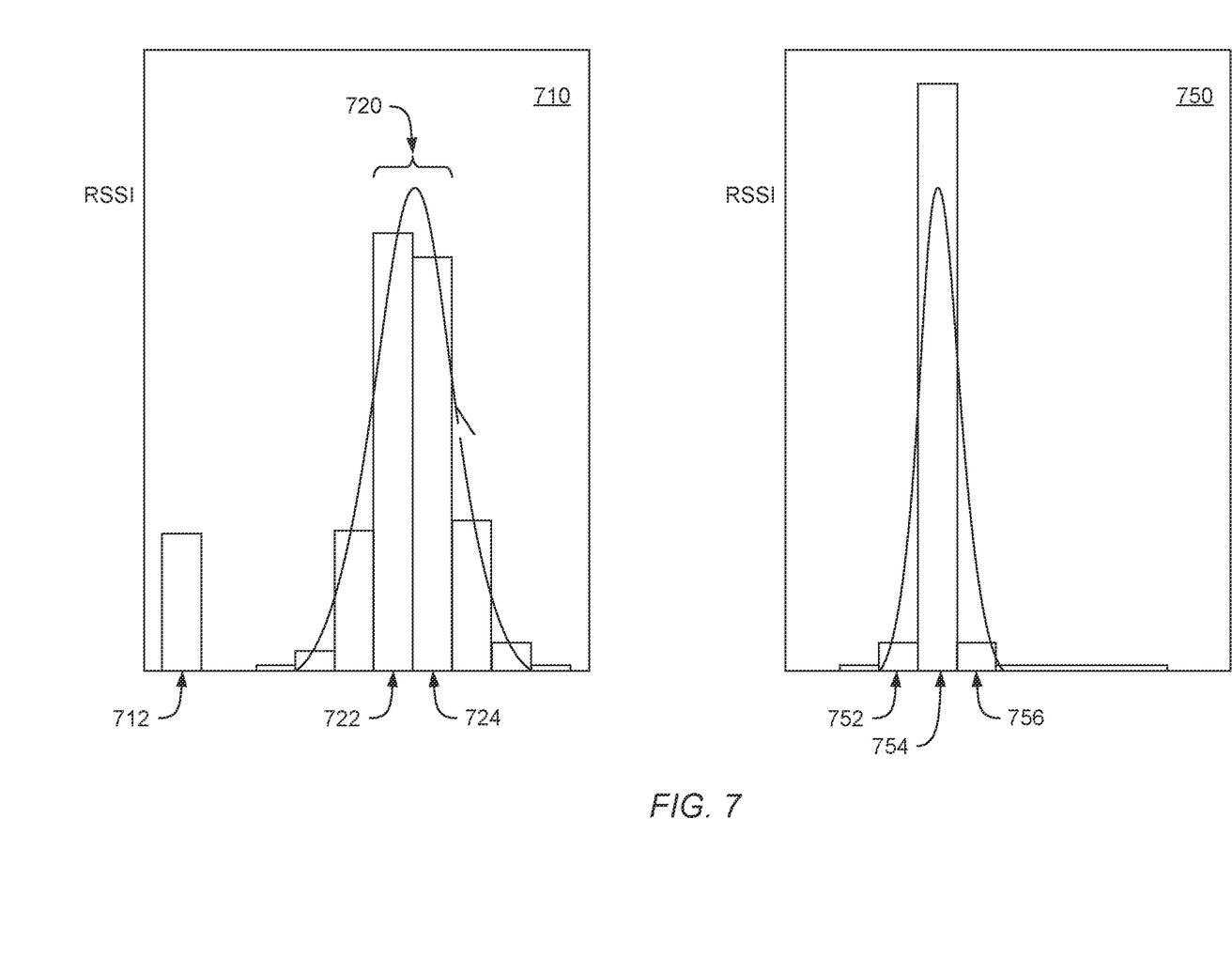
FIG. 7 illustrates using location buddies to compute the location of an STA, according to according to at least one embodiment

FIG. 7 illustrates using location buddies to compute the location of an STA, according to according to at least one embodiment. In an embodiment, a graph 710 illustrates RSSI at an STA for APs 712, 722, and 724. A proximity service (e.g., the proximity service 214 or the proximity service 264 illustrated in FIG. 2) has grouped the APs 722 and 724 into a location buddy group 720.

Assume the AP 712 is located far away from the STA, physically, but detects the STA. The AP 712 does not have a location buddy that detects the STA. The proximity service therefore recognizes the AP 712 as a likely outlier and located at a distance from the STA, because the AP 712 does not have a location buddy that also detects the STA. Therefore the proximity service uses the APs 722 and 724, in the location buddy group 720, and not the AP 712, to estimate the location of the STA.

A graph 750 illustrates RSSI at an STA for APs 752, 754, and 756. The AP 754 detects the STA. The APs 752 and 756 are physical neighbors of the AP 754, but do not detect the STA. The RSSI at the STA for the AP 754 is high, and in prior solutions the AP 754 would likely be used to estimate the location of the STA.

In an embodiment, however, the proximity service determines that the AP 754 does not have a location buddy that also detects the STA (e.g., neither of the APs 752 or 756 detects the STA). The proximity service identifies the AP 754 as a likely outlier, and does not initially use the AP 754 to estimate the location of the STA. For example, in an embodiment, the proximity service can attempt to use a location buddy group that detects the STA (e.g., as discussed above with regard to FIG. 5) to estimate the location of the STA. If the proximity service is not able to locate a suitable location buddy group, the proximity service can then use the AP 754 to estimate the location of the STA.

Figure 8A:
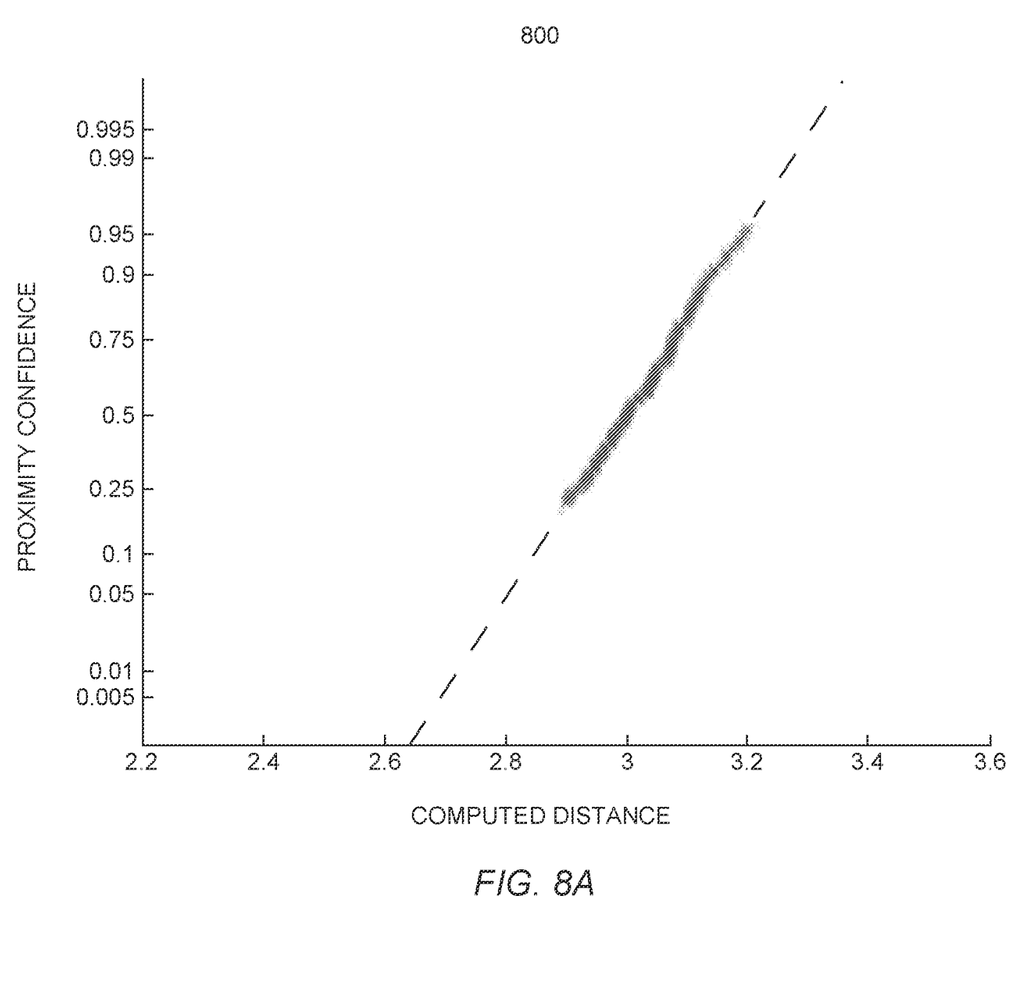
FIGS. 8A-8B illustrate using location buddies to compute the location of an STA, according to according to at least one embodiment.
Figure 8B:
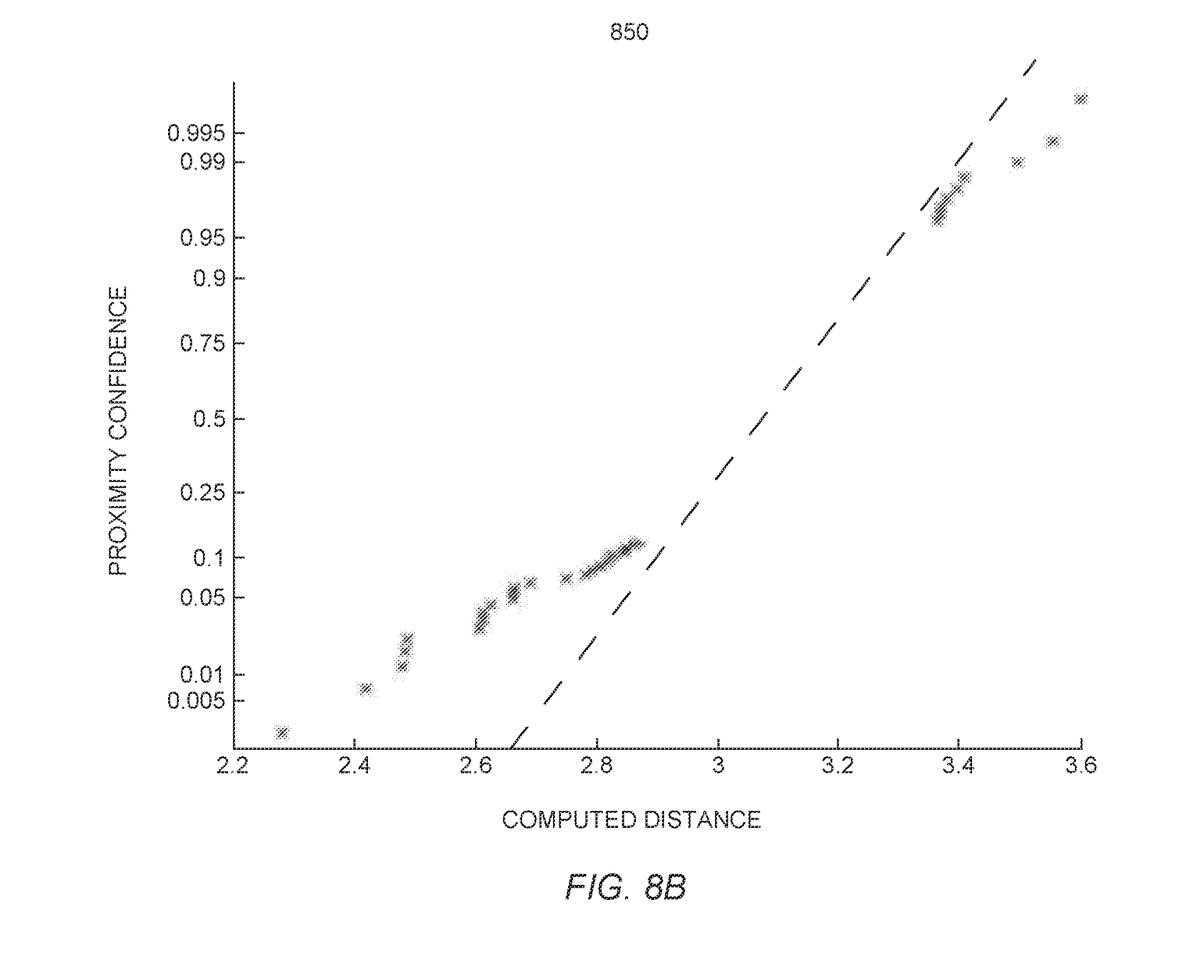

FIGS. 8A-8B illustrate using location buddies to compute the location of an STA, according to according to at least one embodiment. FIG. 8A includes a graph 800 illustrating an adaptive proximity based confidence value derived to compare RF distance (e.g., as measured using RSSI) with the physical distance of a target STA to the closest AP, physically. The proximity confidence value is derived iteratively for all groups of location buddies, and gives a holistic view as to which AP is closer to the client and can be classified as a genuine buddy in the appropriate area (e.g., the appropriate floor of a building). Using this proximity confidence value facilitates identifying a preferred target AP, in a location buddy group, with a high degree of confidence.

As illustrated in FIG. 8A, the proximity confidence value has a linear relationship with the physical distance between the target STA and AP. In the graph 800, the geometric physical distance is plotted on the x-axis and the derived proximity based confidence value is plotted on the y-axis. As an example, assume a target AP has a strong RSSI to a target STA, and is located in the same physical area as the STA (e.g., the same floor of a building). The location buddy for that target AP is close in RF distance to the target AP, and there is a strong correlation between the RF distance and the physical geometric distance. Even if the physical distance (e.g., as shown along the x-axis) increases, the estimated location by the location buddy will have a high correlation and a high proximity based confidence value.

FIG. 8B includes a graph 850 showing that, if a target AP is present in a different physical area from a target STA (e.g., a different floor of a building), a location buddy for that target AP will have a relatively weaker RSSI to the STA, and there is little or no correlation between the RSSI based location estimate and the actual physical geometric location of the STA. This is demonstrated by the non-linear plot of the graph 850, which also includes the geometric physical distance plotted on the x-axis and the derived proximity based confidence value plotted on the y-axis. In an embodiment, a locator service (e.g., the locator service 212 or the locator service 262 illustrated in FIG. 2) could use a real-time comparison of the values illustrated in the graphs 800 and 850 to ignore outlier values and alleviate miscalculation of locations (e.g., based on incorrect floors or higher gain antenna APs). This can result in more accurate location estimates, as described above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   identifying a first target wireless access point (AP) radio communicatively coupled to a wireless station (STA);
   identifying a first one or more location buddy AP radios, relating to the first target AP radio;
   determining that a first location buddy AP radio of the first one or more location buddy AP radios is communicatively coupled to the STA, and in response determining a location of the STA using the first target AP radio;
   identifying a second target AP radio communicatively coupled to the STA;
   identifying a second one or more location buddy AP radios relating to the second target AP radio; and
   determining that none of the second one or more location buddy AP radios is communicatively coupled to the STA, and in response declining to use the second target AP radio for determining the location of the STA.

2. The method of claim 1, wherein determining that none of the second one or more location buddy AP radios is communicatively coupled to the STA is based on one or more signal strengths relating to the second one or more location buddy AP radios and the STA.

3. The method of claim 1, wherein the determining the location of the STA is further based on the first location buddy AP radio.

4. The method of claim 3, wherein the determining the location of the STA further comprises:
   determining first radio signal strength from the STA to the first location buddy AP radio;
   determining second radio signal strength from the STA to the first target AP radio; and
   determining a distance from the first location buddy AP radio to the first target AP radio, wherein the determining the location of the STA is based on the first radio signal strength, the second radio signal strength, and the distance.

5. The method of claim 1, wherein the first target AP radio and the first one or more location buddy AP radios are grouped, prior to identifying the first target wireless AP radio, based on a map depicting a physical location of the first one or more location buddy AP radios and the first target AP radio.

6. The method of claim 5, wherein the map comprises a digital image and wherein the grouping the first target AP radio and the first one or more location buddy AP radios comprises using image recognition to identify the physical location of the first one or more location buddy AP radios and first target AP radio in the digital image.

7. The method of claim 6, wherein the grouping the first target AP radio and the first one or more location buddy AP radios is based on both physical distance from the first target AP radio to the first one or more location buddy AP radios and radio frequency (RF) distance from the first target AP radio to the first one or more location buddy AP radios.

8. The method of claim 1, wherein the first target AP radio and the first one or more location buddy APs are grouped, prior to identifying the first target AP radio, based on input from a user.

9. A computer program product, comprising:
   a non-transitory computer-readable storage medium having computer-readable program code embodied therewith, the computer-readable program code executable by one or more computer processors to perform an operation, the operation comprising:
      identifying a target wireless access point (AP) radio communicatively coupled to a wireless station (STA);
      identifying one or more location buddy AP radios, relating to the target AP radio, based on a physical location of the one or more location buddy AP radios and the target AP radio,
         wherein the target AP radio and the one or more location buddy AP radios are grouped, prior to identifying the target wireless AP radio, based on a map depicting the physical location of the one or more location buddy AP radios and the target AP radio, and wherein the grouping the target AP radio and the one or more location buddy AP radios comprises identifying the physical location of the one or more location buddy AP radios and target AP radio using the map; and determining that a first location buddy AP radio of the one or more location buddy AP radios is communicatively coupled to the STA, and in response determining a location of the STA using the target AP radio.

10. The computer program product of claim 9, the operation further comprising:
   identifying a second target AP radio communicatively coupled to the STA;
   identifying a second one or more location buddy AP radios relating to the second target AP radio; and
   determining that none of the second one or more location buddy AP radios is communicatively coupled to the STA, and in response declining to use the second target AP radio for determining the location of the STA.

11. The computer program product of claim 10, wherein determining that none of the second one or more location buddy AP radios is communicatively coupled to the STA is based on one or more signal strengths relating to the second one or more location buddy AP radios and the STA.

12. The computer program product of claim 9, wherein the determining the location of the STA is further based on the first location buddy AP radio and wherein the determining the location of the STA further comprises:
   determining first radio signal strength from the STA to the first location buddy AP radio;
   determining second radio signal strength from the STA to the target AP radio; and
   determining a distance from the first location buddy AP radio to the target AP radio, wherein the determining the location of the STA is based on the first radio signal strength, the second radio signal strength, and the distance.

13. The computer program product of claim 9, wherein the grouping the target AP radio and the one or more location buddy AP radios is based on both physical distance from the target AP radio to the one or more location buddy AP radios and radio frequency (RF) distance from the target AP radio to the one or more location buddy AP radios.

14. A system, comprising:
   a processor; and
   a memory storing a program, which, when executed on the processor, performs an operation, the operation comprising:
      identifying a first target wireless access point (AP) radio communicatively coupled to a wireless station (STA);
      identifying a first one or more location buddy AP radios, relating to the first target AP radio;
      determining that a first location buddy AP radio of the first one or more location buddy AP radios is communicatively coupled to the STA, and in response determining a location of the STA using the first target AP radio;
      identifying a second target AP radio communicatively coupled to the STA;
      identifying a second one or more location buddy AP radios relating to the second target AP radio; and
      determining that none of the second one or more location buddy AP radios is communicatively coupled to the STA, and in response declining to use the second target AP radio for determining the location of the STA.

15. The system of claim 14, wherein determining that none of the second one or more location buddy AP radios is communicatively coupled to the STA is based on one or more signal strengths relating to the second one or more location buddy AP radios and the STA.

16. The system of claim 14, wherein the determining the location of the STA is further based on the first location buddy AP radio.

17. The system of claim 16, wherein the determining the location of the STA further comprises:
   determining first radio signal strength from the STA to the first location buddy AP radio;
   determining second radio signal strength from the STA to the first target AP radio; and
   determining a distance from the first location buddy AP radio to the first target AP radio, wherein the determining the location of the STA is based on the first radio signal strength, the second radio signal strength, and the distance.

18. The system of claim 14, wherein the first target AP radio and the first one or more location buddy AP radios are grouped, prior to identifying the first target AP radio, based on a map depicting a physical location of the first one or more location buddy AP radios and the first target AP radio.

19. The system of claim 18, wherein the map comprises a digital image and wherein the grouping the first target AP radio and the first one or more location buddy AP radios comprises using image recognition to identify the physical location of the first one or more location buddy AP radios and first target AP radio in the digital image.

20. The system of claim 19, wherein the grouping the first target AP radio and the first one or more location buddy AP radios is based on both physical distance from the first target AP radio to the first one or more location buddy AP radios and radio frequency (RF) distance from the first target AP radio to the first one or more location buddy AP radios.

* * * * *